United States Patent [19]

Mitchell et al.

[11] Patent Number: 5,517,554
[45] Date of Patent: May 14, 1996

[54] APPARATUS AND METHOD FOR LOCKING A MOBILE COMMUNICATION UNIT

[75] Inventors: John J. Mitchell, Crystal Lake; Hope Braun, Lake Zurich; Harold Patrick, West Dundee; Mark Acheson, Mount Prospect, all of Ill.; Joseph J. Coffey, Marlton, N.J.

[73] Assignee: Motorola, Inc., Schaumburg, Ill.

[21] Appl. No.: 273,044

[22] Filed: Jul. 8, 1994

[51] Int. Cl.⁶ .................................................. H04Q 7/22
[52] U.S. Cl. ............................................. 379/59; 379/58
[58] Field of Search ................................ 379/58, 59, 61, 379/62, 63, 91, 114, 207; 455/33, 33.2

[56] References Cited

U.S. PATENT DOCUMENTS

| | | | |
|---|---|---|---|
| 4,958,368 | 9/1990 | Parker | 379/59 X |
| 5,031,204 | 7/1991 | McKernan | 379/59 X |
| 5,046,082 | 9/1991 | Zicker et al. | 379/59 |
| 5,303,285 | 4/1994 | Kerihuel et al. | 379/62 X |

*Primary Examiner*—Curtis Kuntz
*Assistant Examiner*—Michael B. Chernoff
*Attorney, Agent, or Firm*—Jeffrey G. Toler; Anthony G. Sitko

[57] ABSTRACT

The present invention provides an apparatus and method for locking the mobile identification number (MIN) of a mobile communication unit (22,24) at the mobile switching center (MSC) (18). Once a MIN is locked at the MSC, the cellular communication system (10) will block any mobile communication unit (22,24) attempting to originate a call with the locked MIN, even if it is the mobile communication unit (22) assigned the locked MIN which is attempting to place the call. The user may lock and unlock the mobile communication unit MIN from any public switch telephone (26), from selected public switch telephones, from the mobile communication unit (22) itself, from other mobile communication units (24). The mobile communication unit MIN may also be locked by default.

19 Claims, 3 Drawing Sheets

10

APPARATUS AND METHOD FOR LOCKING A MOBILE COMMUNICATION UNIT

FIELD OF THE INVENTION

The present invention relates generally to cellular communication systems, and particularly, to an apparatus and method for locking a mobile communication unit.

BACKGROUND OF THE INVENTION

Cellular communication systems are known. In such systems, a subscriber or user, purchases a mobile communication unit which provides the user with access to the cellular communication system. When the user purchases the mobile communication unit, the mobile communication unit is assigned a mobile identification number (MIN) and electronic serial number (ESN) which are used to identify the mobile communication unit when it operates within the cellular communication system, and therefore, identifies the user for billing purposes. When in use, the mobile communication units communicate, via radio transmission, with base station transceivers within the cellular communication system. The base station transceivers further communicate with a base station controller which in turn communicates with a mobile switching center (MSC). From the MSC, a user can be connected to other cellular communication system users or to public switch telephone network (PSTN) users. In establishing communications within the cellular system, the mobile communication unit is required to broadcast, over the air, the MIN and the ESN. This is required so that the mobile switching center serving the cellular communication system can identify the mobile communication unit operating in the cellular communication system so that calls placed or received by the mobile communication unit may be properly identified and billed.

Cellular pirates, fraudulent users of the cellular communication system, have developed methods of intercepting the MIN and ESN numbers during such broadcasts when the mobile communication unit is operating in the cellular communication system. The cellular pirates have also developed methods of programming "clone" mobile communication units with the intercepted MIN and ESN numbers. When a clone mobile communication unit accesses the system, the cellular system recognizes the MIN and ESN as being valid and allows the call to proceed. The call, however, is billed to the legitimate cellular user whose mobile communication unit was programmed with the intercepted MIN and ESN. Ultimately, the cellular system operator absorbs losses due to fraudulent calls by not collecting for the fraudulent calls and from lack of system use by legitimate users who have lost confidence in the system.

As a result of such cellular communication system fraud, cellular system operators are subject to extensive losses of revenue. In response, methods to combat the fraudulent use of mobile identification numbers have been developed. For example, it is known to scramble or otherwise encrypt the MIN and ESN during broadcast. This makes intercepting a MIN substantially more difficult. The MIN may still be intercepted, however, and once a MIN is intercepted, it can be used to fraudulently access the cellular communication system.

Another system monitors the cellular communication system for simultaneous use of a MIN. If the same MIN appears registering with the system, i.e., more than one cellular phone attempting to seek access to the system using the same MIN, the system recognizes a fraud situation and locks out the MIN from further use of the cellular system. The legitimate user must then contact the cellular operator to receive a new MIN before being allowed further use of the cellular system, and the fraudulent user is locked out. This method suffers several disadvantages. For example, fraudulent users are only detected if there is simultaneous access to the system. Therefore, unless the legitimate user, or a second fraudulent user, are registering within the cellular communication system at the same time as the pirate user, no fraud is detected. Therefore, MINs are still intercepted and used until a fraudulent use is detected. At that time, the legitimate user, at an extreme inconvenience, is forced to contact his cellular operator for a new MIN and is unable to use the cellular system until they do so.

Another system for detecting fraud monitors the radio frequency signatures, or fingerprints, of mobile communication units to identify legitimate users and deny access to the system by fraudulent users. This system, however, requires the cellular system operator to purchase and maintain additional hardware and software. In addition, there is additional processing involved for each call placed, increasing power consumption within the cellular communication equipment and increasing the connection time for the user placing or receiving a call. Therefore, while each of these systems help prevent cellular fraud, there remains a need for further enhancing the security of the cellular system.

DETAILED DESCRIPTION OF THE INVENTION

The present invention provides an apparatus and method for locking a mobile communication unit by locking the mobile identification number (MIN) assigned to the mobile communication unit at the mobile switching center (MSC). Once a MIN is locked at the MSC, access will be denied to any mobile communication unit attempting to originate a call in the cellular communication system with the locked MIN, even if it is the mobile communication unit legitimately assigned the locked MIN which is attempting to place the call. Moreover, a mobile pirate can not use a locked MIN to place calls with either the legitimate or a cloned mobile communication unit. Therefore, because the MIN can be locked by the user when the mobile communication unit is not in use, cellular fraud is substantially inhibited. The present invention provides, in several embodiments as will be described, for user locking and unlocking of the MIN from any public switch telephone, from selected public switch telephones, from the mobile communication unit itself, or from other mobile communication units. The present invention also provides for user activated locking of the MIN by default.

Figure 1:
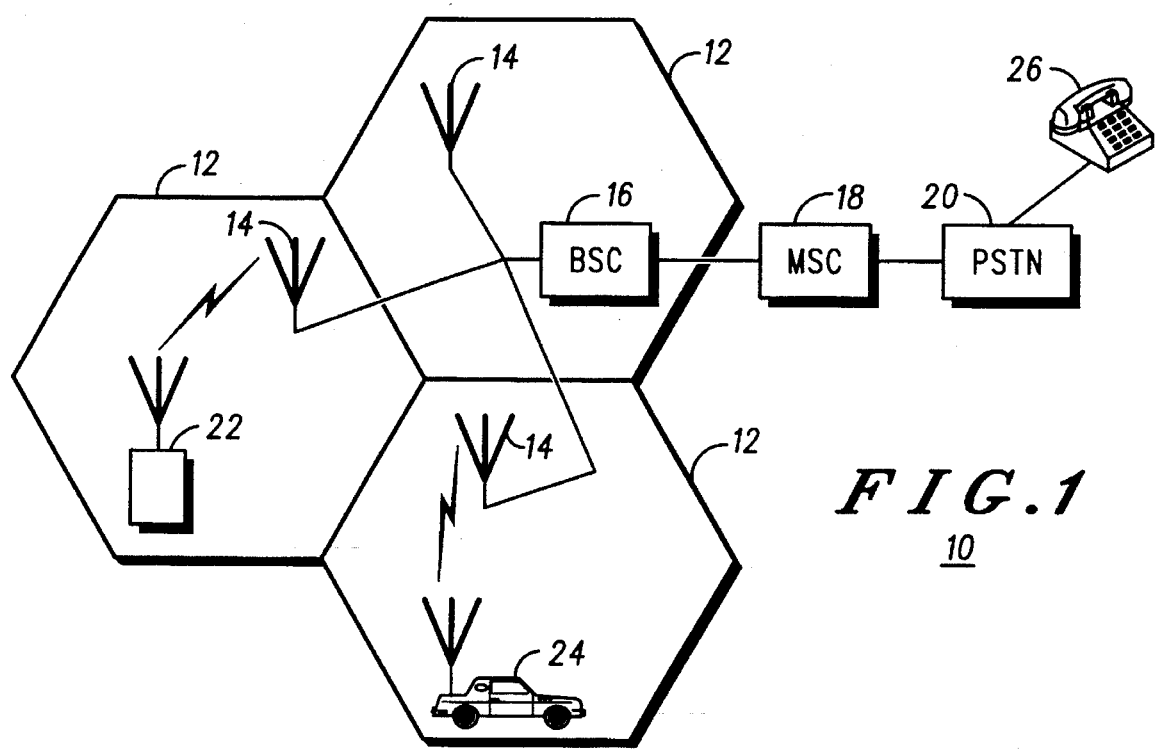
FIG. 1 is a block diagram of a typical cellular communication system.

With reference to the drawings, and particularly to FIG. 1, a typical cellular communication system 10 is shown which includes a plurality of cells 12 serviced by base station transceivers (BSTs) 14 which are linked to a base station controller (BSC) 16 which is linked to a mobile switching center (MSC) 18 in a known manner. The MSC 18 is further connected to the public switch telephone network (PSTN) 20 in a known manner. A plurality of mobile communication units indicated generally as 22 and 24 operate in a known manner within the cellular communication system through BSTs 14. It should be understood from the outset that the present invention is applicable to both analog and digital cellular systems.

The MSC 18 is known to contain processing capability, switching capability and memory which includes a database of cellular system users locally assigned within the cellular communication system. The user information is stored within the MSC 18 in the home location register (HLR) assigned to the user and includes the user's mobile identification number (MIN), electronic serial number (ESN) and a personal identification number (PIN) as well as several indicators to identify the particular services, including the locking feature, purchased by the user. The MSC 18 also retains in its memory indicators to reflect the status of the user's MIN, i.e., whether it is locked or unlocked. Still other pieces of user information are contained in the memory of the MSC 18 as will be described.

Figure 2:
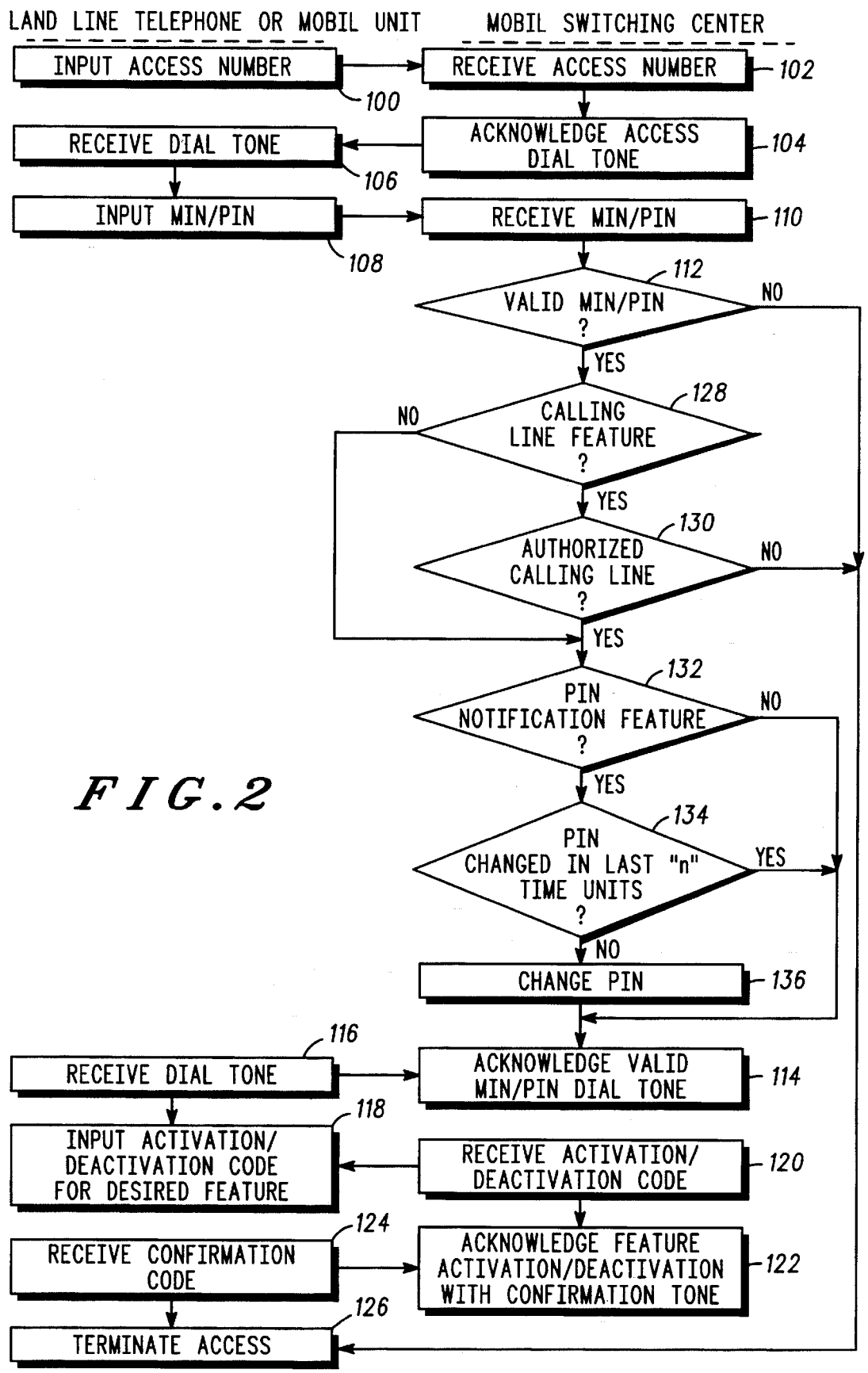
FIG. 2 is a flow chart illustrating a preferred embodiment for locking a mobile communication unit in accordance with the present invention.

In accordance with a preferred embodiment of the present invention, the mobile user can lock the MIN assigned to a mobile communication unit 22 at the MSC 18 by directly accessing the MSC 18 from a land line telephone 26 through the PSTN 18 or by a mobile telephone 24 operating within a cellular communication system. With reference to FIG. 2, the user is allowed access to MSC 18 by first dialing an access number 100. The MSC 18 receives the access code number 102 and responds with a dial tone 104. The user receives the dial tone 106 and responds by keying in the MIN and the PIN 108. The MSC 18 receives the MIN and PIN 110 and verifies, based on the information stored in its memory, that the MIN and associated PIN are correct 112. If the MIN and PIN are correct, a dial tone is once again provided to the user 114. The user receives the dial tone 116 and responds by entering an activation/deactivation code 118. That is, if the MIN is presently locked, the user will enter a deactivation code to unlock the MIN, and vice versa if the MIN is unlocked, the user will enter an activation code to lock the MIN. The MSC 18 receives and processes the code 120 and responds by sending a confirmation tone or announcement 122 signaling to the user that the mobile communication unit MIN has been unlocked/locked 124. Access to the MSC 18 is then terminated 126.

Once the MIN is locked, if the user, or a fraudulent user with a cloned phone using the user's MIN, attempts to place a call, the MSC through which the call is being placed will deny access to the mobile communication unit until the MIN is successfully unlocked. It should be understood that the standards for inter-cellular system interface and compatibility are applicable for allowing an MSC serving one cellular communication system to identify and verify whether a mobile communication unit MIN which is local to a different MSC in another cellular communication system is locked or unlocked.

As described, the user may unlock the MIN from a land line telephone 26 or another mobile communication unit 24. It should be understood that a user may unlock the MIN from the mobile communication unit 22 with the presently locked MIN. As noted above, the user accesses the MSC 18 by dialing an access number (step 100). A mobile communication unit 22 with a locked MIN may still access the MSC 18 via the access number. Once accessing the MSC 18 in such a manner, the unlocking procedure is accomplished, as described, to unlock the MIN.

As further shown in FIG. 2, a user may specify particular calling lines, i.e., telephone numbers, from which the MIN may be locked or unlocked. If this feature is activated 128, the MSC verifies that the access was made from one of the specified calling lines 130. The valid calling lines are stored within the memory of the MSC in relation with the MIN and other user information. If the calling line is not one of the specified calling lines, access is terminated 126. Therefore, even in the event where both the MIN and the PIN are intercepted by a cellular pirate, unless the MSC 18 is accessed from one of the predetermined calling lines, the MIN can not be unlocked.

Security of the MIN and the cellular communication system may be further enhanced by requiring periodic verification and updating of the user's PIN. As shown in FIG. 2, if the user's has purchased the PIN notification feature 132, and the PIN has not been updated within a number "n" of time units 134, the user is prompted to change the PIN in a manner similar to locking or unlocking the MIN 136. That is, the user enters an activation code for modifying the PIN and the new PIN. A confirmation tone is then provided, as before, to indicate to the user that the PIN has been changed 122.

Figure 3:
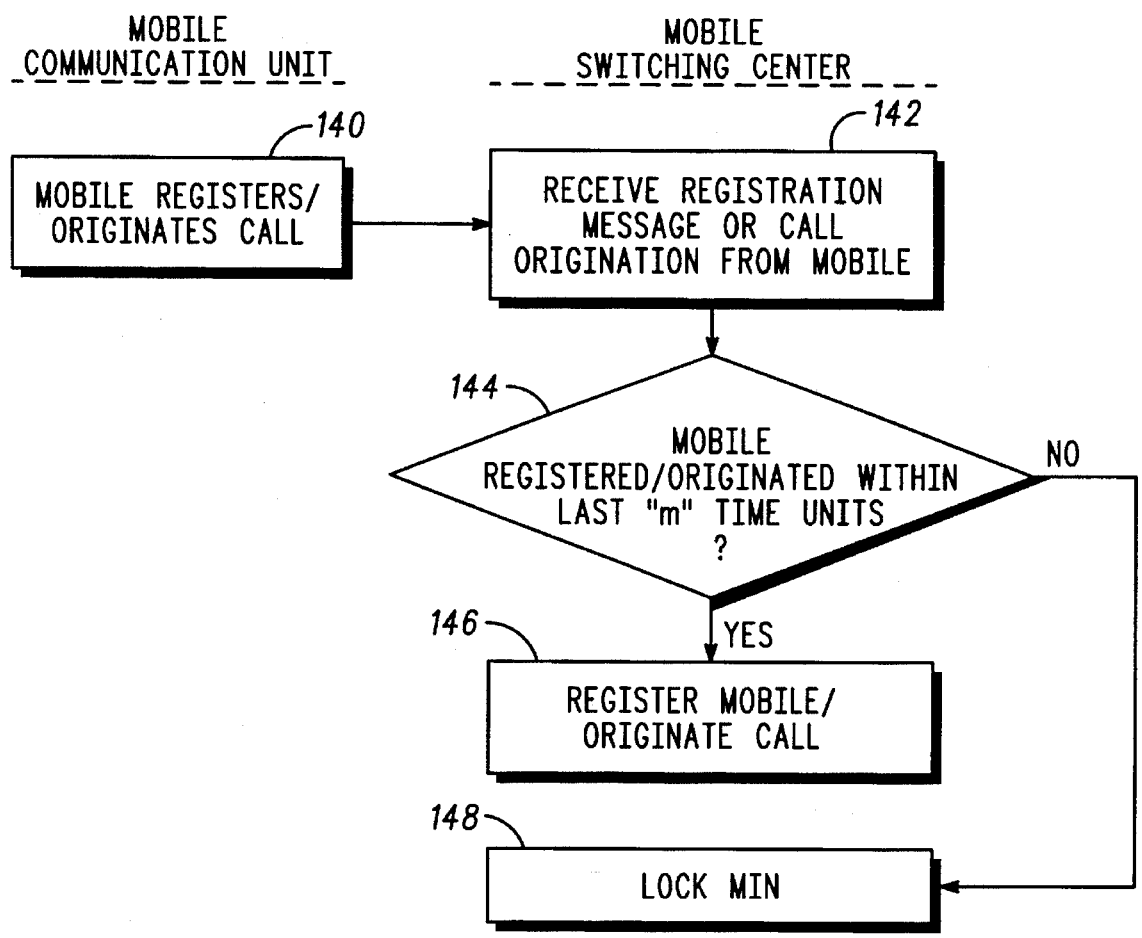
FIG. 3 is a flow chart illustrating another preferred embodiment for locking a mobile identification number in accordance with the present invention.

In another embodiment illustrated in FIG. 3, the MIN may be locked by default. Each time a mobile unit is activated within a cellular communication system, it registers with the local MSC. The present invention provides for locking the MIN if the mobile communication unit has not registered or originated a call through the MSC within a predefined number of time units. As shown in FIG. 3, when a mobile communication unit attempts to register or originate a call through, for example, MSC 18, 140, the MSC 18 receives the registration message or call origination request 142. The MSC 18 then checks the last time the mobile communication unit with the assigned MIN registered or originated a call, and If the time period exceeds a predefined number "m" of time units 144, the MSC 18 locks the MIN 146. In this case, access by the mobile communication unit to the cellular communication system 10 is denied until the MIN is unlocked according to the foregoing procedure requiring entry of the PIN. If the MIN has registered within the predefined number of time units, and the MIN is not otherwise locked, the mobile communication unit is registered or the call originated thus allowing access to the cellular communication system 10.

The present invention has been described for exemplary purposes in terms of several preferred embodiments. It should be understood, however, that persons of ordinary skill in the art may otherwise embody its broad teachings without departing from the fair scope as defined in the subjoined claims.

We claim:

1. An apparatus for allowing a user to lock a mobile communication unit in a cellular communication system to prevent access by an unauthorized user, the mobile communication unit being identified within the cellular communication system by a mobile identification number, the apparatus comprising:

a mobile switching center;

means for remotely accessing, without operator assistance,, the mobile switching center;

means for allowing the user to communicate the mobile identification number of the mobile communication unit to be locked to the mobile switching center; and means for allowing the user to instruct the mobile switching center to inhibit operation of any mobile communication unit once identified by the mobile switching center as having the same communicated mobile identification number.

2. The apparatus of claim 1 wherein the means for accessing a mobile switching center comprises a land line telephone.

3. The apparatus of claim 1 wherein the means for accessing a mobile switching center comprises a mobile communication unit.

4. The apparatus of claim 1 wherein the mobile identification number is associated with a personal identification number.

5. The apparatus of claim 4 further comprising means for verifying the mobile identification number and the personal identification number.

6. The apparatus of claim 1 wherein the means for allowing a user to instruct the mobile switching center includes means for communicating an activation code to the mobile switching center.

7. The apparatus of claim 1 further comprising means for unlocking a locked mobile communication unit.

8. The apparatus of claim 1 further comprising means for confirming inhibit operation of mobile communication units identified by the communicated mobile identification number.

9. The apparatus of claim 2 wherein the means for accessing the mobile switching center is further operable for restricting access to the mobile switching center to particular user identified land line telephones.

10. The apparatus of claim 1 wherein the means for remotely accessing the mobile switching center comprises means for registering the mobile communication unit with the mobile switching center, and the means for allowing a user to instruct the mobile switching center comprises means for determining the time period since the mobile communication unit last registered with the mobile switching center and for instructing the mobile switching center to inhibit operation of any mobile communication unit once identified by the mobile switching center as having the same communicated mobile identification number if the time period exceeds a threshold value.

11. A method of allowing a user to lock a mobile communication unit in a cellular communication system, the cellular communication system including a mobile switching center and the mobile communication unit being identified to the mobile switching center by a mobile identification number, the method comprising:

the user remotely and without operator assistance accessing the mobile switching center;

receiving the mobile identification number from the user of the mobile communication to be locked at the mobile switching center; and the user instructing the mobile switching center to inhibit operation of any mobile communication unit once identified by the mobile switching center as having the same received mobile identification number.

12. The method of claim 11 wherein the step of receiving the mobile identification number further comprises the step of receiving a personal identification code from the user.

13. The method of claim 11 wherein the step of accessing comprises the step of accessing via a land line telephone.

14. The method of claim 11 wherein the step of accessing comprising the step of accessing via a particular user identified land line telephone.

15. The method of claim 11 wherein the step of accessing comprises the step of accessing via a mobile communication unit.

16. The method of claim 11 further comprising the step of confirming inhibited operation of the mobile communication unit identified by the communicated mobile identification number.

17. The method of claim 11 wherein the step of instructing further comprises the step of receiving an activation code at the mobile switching center from the user.

18. The method of claim 11 wherein the step of accessing comprises the step of registering the mobile communication unit with the mobile switching center and the step of instructing comprises determining the time period since the mobile communication unit last registered with the mobile switching center and inhibiting operation of any mobile communication unit once identified by the mobile switching center as having the same received mobile identification number if the time period exceeds a threshold value.

19. An apparatus for locking a mobile communication unit in a cellular communication system, the mobile communication unit being identified within the cellular communication system by a mobile identification number, the apparatus comprising:

a mobile switching center for processing communications within the cellular communication system;

means for remotely accessing the mobile switching center, said means for remotely accessing the mobile switching center comprising means for registering the mobile communication unit with the mobile switching center;

means for communicating the mobile identification number of the mobile communication unit to be locked to the mobile switching center; and means for instructing the mobile switching center to inhibit operation of any mobile communication unit once identified by the mobile switching center as having the same communicated mobile identification number, said means for instructing the mobile switching center comprising means for determining the time period since the mobile communication unit last registered with the mobile switching center and for instructing the mobile switching center to inhibit operation of any mobile communication unit identified by the mobile switching center as having the same communicated mobile identification number if the time period exceeds a threshold value.

* * * * *

UNITED STATES PATENT AND TRADEMARK OFFICE
CERTIFICATE OF CORRECTION

PATENT NO. : 5,517,554
DATED : May 14, 1996
INVENTOR(S) : Mitchell, John et al.

It is certified that error appears in the above-indentified patent and that said Letters Patent is hereby corrected as shown below:

At column 4, line 62, "tance,," should be --tance,--.

Signed and Sealed this

Twenty-third Day of July, 1996

Attest:

BRUCE LEHMAN

Attesting Officer      Commissioner of Patents and Trademarks